(12) United States Patent
Hoshii

(10) Patent No.: US 7,163,270 B2
(45) Date of Patent: Jan. 16, 2007

(54) PRINT CONTROLLER, PRINT CONTROL PROGRAM PRODUCT, AND METHOD FOR PRINT CONTROL

(75) Inventor: Jun Hoshii, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 256 days.

(21) Appl. No.: 10/795,016

(22) Filed: Mar. 3, 2004

(65) Prior Publication Data

US 2004/0239726 A1 Dec. 2, 2004

(30) Foreign Application Priority Data

Mar. 4, 2003 (JP) .............................. 2003-056903

(51) Int. Cl.
*B41J 2/205* (2006.01)
(52) U.S. Cl. .......................................... 347/15; 358/1.2
(58) Field of Classification Search .................. 347/15; 358/1.2, 1.9, 43
See application file for complete search history.

(56) References Cited

U.S. PATENT DOCUMENTS

2004/0119765 A1* 6/2004 Fujimori et al. ............... 347/9

FOREIGN PATENT DOCUMENTS

JP  2000-071439  3/2000

OTHER PUBLICATIONS

Abstract of Japanese Patent Publication No. 2000-071439, Pub. Date: Mar. 7, 2000, Patent Abstracts of Japan.

* cited by examiner

*Primary Examiner*—Lamson Nguyen
(74) *Attorney, Agent, or Firm*—Martine Penilla & Gencarella, LLP

(57) ABSTRACT

It used to be impossible to convert color component values into dot data for large, medium, and small dots so that a favorable result is obtained with respect to every ink color.

Image data wherein images are rendered with color component values corresponding to ink colors used in a printing device is acquired. In recording rate conversion data, the color component values in the image data are in correspondence with ink recording rates for a plurality of dot diameters. At the same time, ink colors to which individual recording rate conversion data is applied are determined beforehand. A plurality of pieces of the data is stored on a predetermined storage medium beforehand. The recording rate conversion data applied to ink color is referred to with respect to the color component value in the acquired image data. Then, the color component values are converted into ink recording rates for a plurality of dot diameters, and print operation is performed based on the ink recording rates obtained by the conversion.

9 Claims, 9 Drawing Sheets

PRINT CONTROLLER, PRINT CONTROL PROGRAM PRODUCT, AND METHOD FOR PRINT CONTROL

BACKGROUND OF THE INVENTION

1. Field of the Invention

The present invention relates to a technique for controlling a printing device wherein ink droplets with a plurality of dot diameters are recorded.

2. Description of the Related Art

Some of recent ink jet printers are so constituted that ink can be discharged through their nozzles with various dot diameters, large, medium, and small. In such printers, the gradation of each pixel can be represented in two or more levels according to the presence or absence of these dots. In this type of ink jet printer, image data is converted into dot data by one-dimensional tables, common to every color, wherein color component values are in correspondence with the recording rates of large, medium, and small dots. The image data is composed of color component values, and the dot data is composed of the recording rates of large, medium, and small dots. Then, each dot data is subjected to half tone processing or the like, and print operation is performed. An example of such techniques is disclosed in Japanese Patent Prepublication No. 2000-71439.

The above-mentioned prior art has a problem. The gradation of dots is represented by a combination of large, medium, and small dots. At this time, it is difficult to carry out such control that the lightness of each ink color in the print result will be optimized against variation in color component value. As a result, it is impossible to convert image data into dot data so as to obtain a favorable result with respect to all the ink colors. More specific description will be given. In the one-dimensional table according to the prior art, the recording rates of large, medium, and small dots are determined based on the weight of ink. No consideration is given to differences in ink characteristics from one color to another. Therefore, optimum conversion for every color cannot be implemented with one-dimensional tables common to every color. For example, deep inks, such as black ink, are prone to give grainy appearance, and pale inks, such as yellow ink, are less prone to give grainy appearance. Therefore, if both are converted using the same one-dimensional table, it is inevitable to make such an adjustment as to obtain an averagely favorable result for all the colors. Thus, it is impossible to accomplish optimum conversion for every color.

SUMMARY OF THE INVENTION

The present invention has been made in consideration of the above problem. The object of the present invention is to provide a print controller, a print control program product, and a method for print control wherein multi-thresholding can be carried out so that a favorable result will be obtained for all the ink colors used in a printing device.

To attain the above object, the present invention is so constituted that a plurality of pieces of recording rate conversion data wherein ink colors to which individual recording rate conversion data is applied are determined beforehand are utilized. Thus, even for the same color component value, different ink recording rates can be obtained depending on ink color. As a result, color component values can be converted into recording rates for individual dot diameters so that a favorable result will be obtained for all the ink colors used in a printing device.

The image data acquiring unit only has to be capable of acquiring image data wherein images are rendered with color component values corresponding to ink colors used in the printing device. Therefore, when print operation is performed, it may directly acquire image data wherein images are rendered with color component values corresponding to the ink colors. Or, it may acquire image data represented in any other format, and the image data may be converted into that wherein images are rendered with color component values corresponding to the ink colors. For example, the present invention maybe so constituted that image data wherein colors are rendered in the CMYK color system is acquired by converting image data wherein colors are rendered in the RGB color system by color conversion profiles.

With respect to a plurality of dots, there only have to be at least two different dot diameters. That is, the present invention is applicable not to a constitution wherein with respect to each pixel, the gradation is represented by only two states, state in which a dot is formed and state in which a dot is not formed. But the present invention is applicable to a constitution wherein three or more gradations, including a difference in dot diameter, can be represented. With respect to a plurality of dot diameters, there only has to be a difference in the diameter of discharged ink droplet. In this sense, there only has to be a difference in the weight of ink droplet.

With respect to recording rate conversion data, there only have to be a plurality of ink colors to be applied thereto determined beforehand. There only have to be at least two different pieces of data for converting the color component value of ink colors into ink recording rates. More specific description will be given. If there are two or more different pieces of recording rate conversion data, different correspondences between color component values and ink recording rates can be defined in correspondence with the characteristics of two or more different inks. As mentioned above, a plurality of different pieces of recording rate conversion data are created beforehand in correspondence of the characteristics of inks. Then, it is made possible to reactively grasp to which ink color the particular recording rate conversion data corresponds. Thus, ink colors to be applied by recording rate conversion data can be determined beforehand. There only have to be two or more different pieces of recording rate conversion data, and needless to add, there is no limitation on the number of pieces of the data. The number of pieces of recording rate conversion data can be appropriately selected according to the number of ink colors and the type of ink characteristics. With respect to each color, one piece of recording rate conversion data may be created.

The image data converting unit refers to recording rate conversion data and converts color component values into ink recording rates for a plurality of dot diameters. In case of the present invention, recording rate conversion data to be referred to differs depending on color. Therefore, when conversion is carried out, recording rate conversion data is appropriately selected according to color. The image printing unit only has to be capable of printing images based on ink recording rates obtained by conversion. It only has to supply a printing device with data required for print operation. This is done by performing half tone processing based on ink recording rates, creating print data for driving the head and nozzles of the printing device from data obtained by half tone processing, or performing like operation.

With respect to a plurality of pieces of recording rate conversion data, they only have to respectively allow favorable conversion for each different ink characteristic. Therefore, a variety of constitutions can be adopted. For example, ink colors to be converted may be determined according to the depth of each ink color. Thus, conversion can be carried out utilizing different pieces of recording rate conversion data depending on the depth of each ink color. With this constitution, disadvantages resulting from differences in depth between ink colors can be eliminated.

One of the disadvantages resulting from differences in depth between ink colors is that the grainy appearance print results give to the user differ depending on the depth of ink color. There are various constitutions to eliminate this disadvantage. An example is a constitution wherein inks in deep colors are frequently used with smaller dot diameters than inks in pale colors are. Inks in deep colors are more prone to give grainy appearance as compared with inks in pale colors. Further, dots of a larger diameter recorded more sparsely are more prone to give grainy appearance.

Consequently, inks in deep colors can be frequently used with a small dot diameter. This prevents grainy appearance from differing depending on the depth of ink color, and further makes print results at every depth less prone to give grainy appearance. The constitution wherein a small dot diameter is frequently used can be implemented by various methods. For example, for large dot diameter, the color component value which gives an ink recording rate of 0 or above can be increased as much as possible.

There are various possible constitutions wherein recording rate conversion data is created with respect to each depth of color. A concrete example is as follows: a printing device uses six colors, C, M, Y, K, lc, and lm (cyan, magenta, yellow, black, light cyan, and light magenta). In the printing device, recording rate data dedicated to K ink is provided for K ink, and recording rate conversion data both for C ink and M ink is provided for C ink and M ink. Further, recording rate conversion data both for lc ink and lm ink is provided for lc ink and lm ink. The C, M, Y, K, lc, and lm inks are all different in depth from one another; however, the K ink is deeper than the C and M inks, and the C and M inks are deeper than the lc and lm inks. The depth of the C ink is at the same level as that of the M ink, and the depth of the lc ink is at the same level as that of the lm ink. Consequently, if the above four different pieces of recording rate conversion data are provided, conversion in accordance with the depth of each ink color can be carried out by a required minimum number of pieces of recording rate conversion data.

The object of the present invention is to carry out multi-thresholding so that a favorable result can be obtained in all the ink colors used in a printing device. There are various possible constitutions to attain this object in addition to the above-mentioned constitution wherein recording rate conversion data is changed depending on color. For example, the quantity itself of ink to be discharged maybe changed. Even if recording rate conversion data common to every color is used to convert color component values into the ink recording rate for a plurality of dot diameters, a favorable result can be obtained in all the ink colors used. This is done by changing the quantity of ink discharged when inks with the respective dot diameters are discharged in the printing device.

Various constitutions can be adopted to change the quantity of ink discharged. For example, in a printing device so designed that the capacities of ink passages are varied by a piezo element or bubbles when inks are discharged, force for varying the capacities can be varied. More specific description will be given. When a dot diameter, large, medium, small, or the like, is specified, the quantity of ink discharged is varied even if a dot with the same diameter is specified. This is done by changing the voltage waveform for driving piezo elements or carrying out like procedures. With this constitution as well, to carry out multi-thresholding so that a favorable result can be obtained in every ink color, the discharge quantity of inks in deeper colors can be made smaller than that of inks in paler colors. With this constitution, the diameter itself of inks in deep colors is reduced, and print results can be made less prone to give grainy appearance due to ink droplets.

The above-mentioned print controller may be solely implemented, or may be incorporated into some equipment and implemented together with another method. Thus, the philosophy of the present invention can be implemented in various embodiments, and the embodiments of the present invention can be modified as appropriate. Up to this point, description has been given to a technique wherein the ink recording rate is made different on a color-by-color basis according to differences in ink characteristics. With this technique, processing is carried out in accordance with predetermined procedures. Needless to add, what underlies the procedures is the present invention. Therefore, the present invention is also applicable as a method. When the present invention is implemented, a predetermined program is sometimes executed on a print controller. The present invention is applicable as such a program product.

Further, any recording medium can be used to provide the program product. For example, the recording medium may be a magnetic recording medium or a magneto-optic recording medium, and this is the same with any recording medium that will be developed in the future. If the present invention is embodied partly in software and partly in hardware, that is completely the same in the philosophy of invention. This includes such an embodiment that part of the program is stored on a recording medium and read in as required.

DETAILED DESCRIPTION

Here, embodiments of the present invention will be described in the following order:
(1) Constitution of Present Invention:
(2) Creation of Recording Rate Conversion Data:

(3) OTHER EMBODIMENTS

Figure 1:
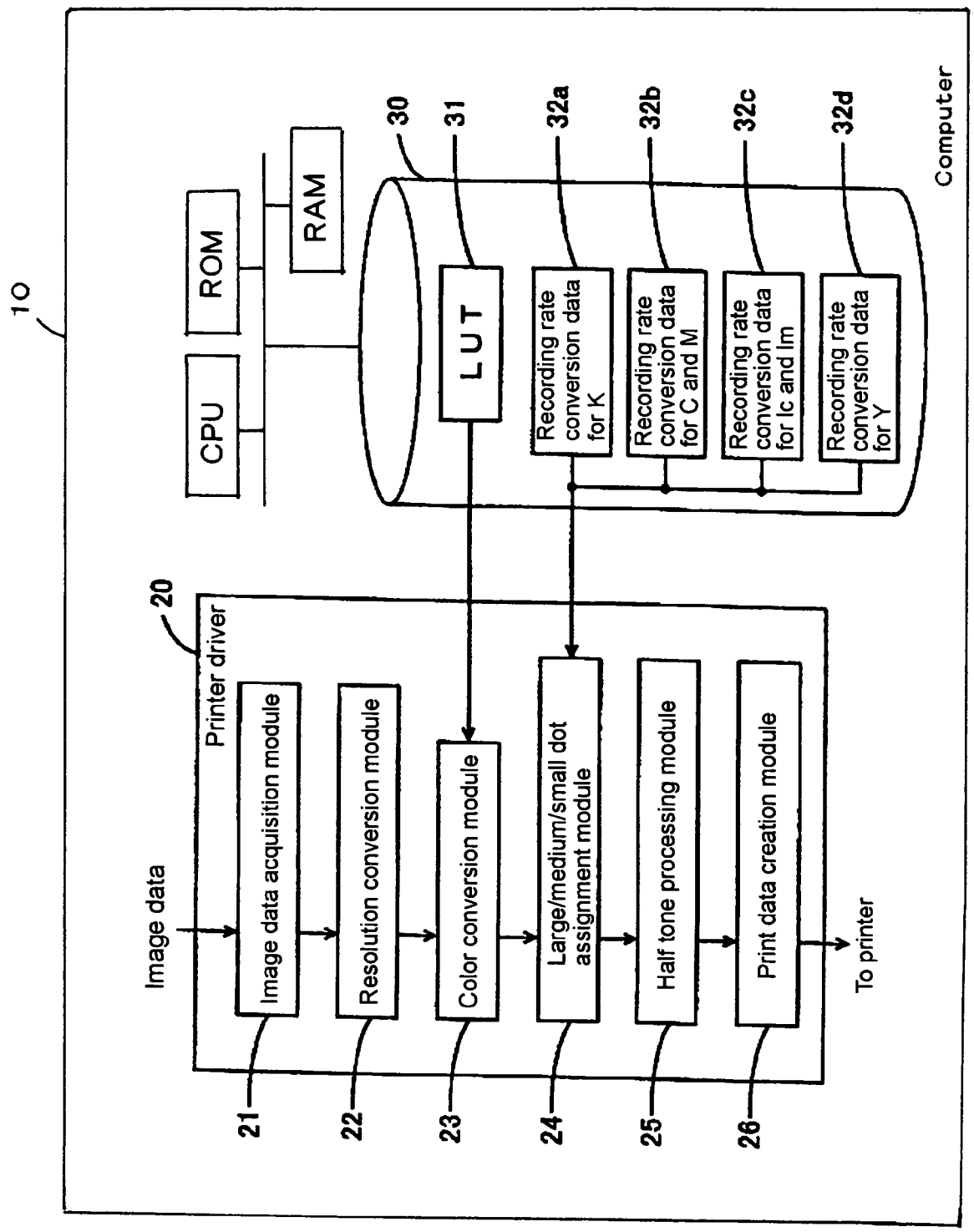
FIG. 1 is a drawing schematically illustrating the configuration of the print control.
Figure 2:
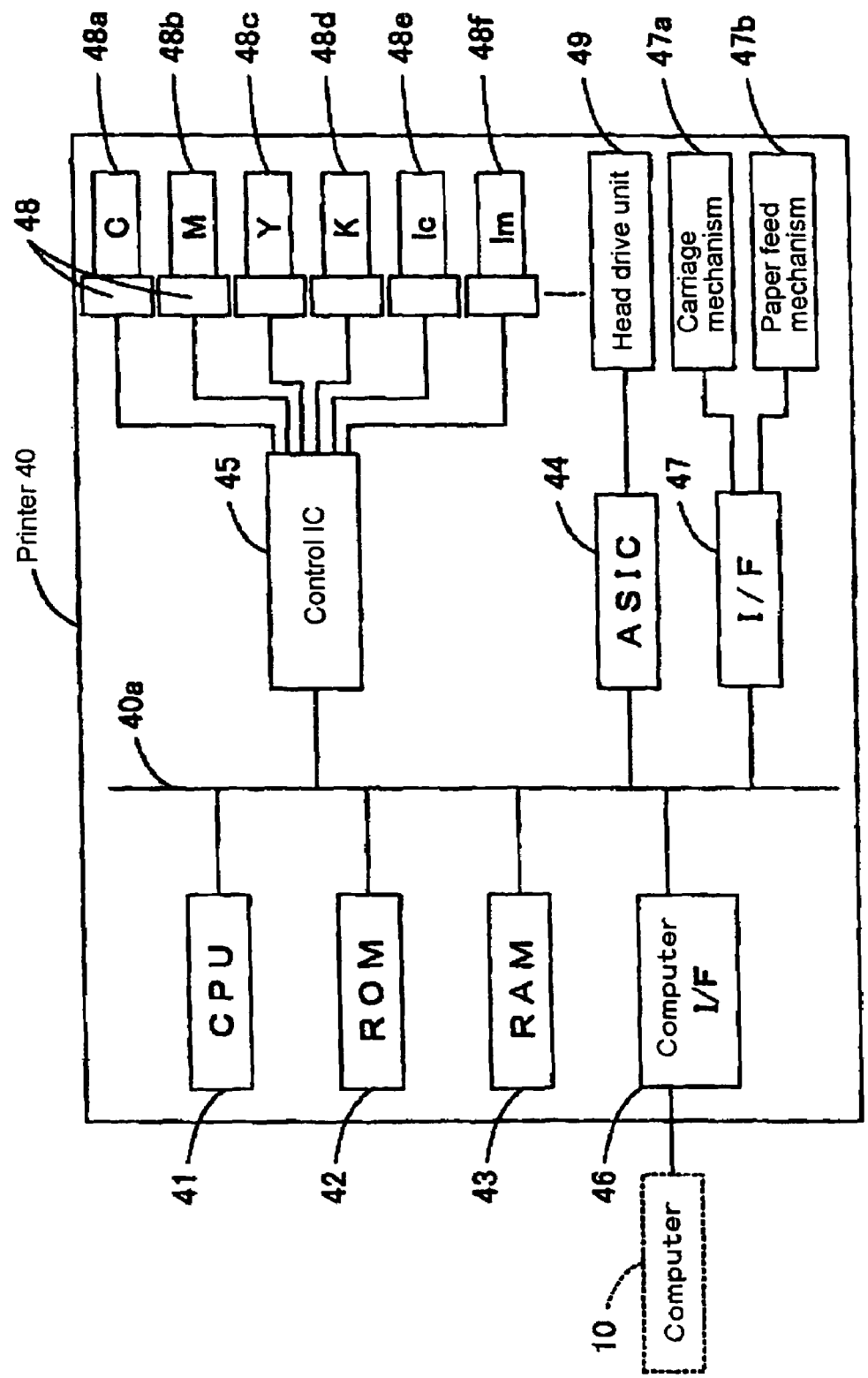
FIG. 2 is a drawing schematically illustrating the hardware configuration of a printer.

(1) Constitution of Present Invention:

FIG. 1 schematically illustrates the configuration of the print control executed on a computer 10 which constitutes the print controller according to the present invention. FIG. 2 schematically illustrates the hardware configuration of a printer to be controlled. The computer 10 comprises CPU which serves as the nerve center for computation, and the CPU controls the entire computer 10 through a system bus. The system bus is connected with ROM, RAM, a hard disk drive 30, a CD-ROM drive (not shown), an input interface, a CRT interface, and a printer interface, and the like. Needless to add, for the computer 10, a wide variety of modes of computer can be adopted, and such a constitution that distributed processing is performed by a plurality of computers may be adopted.

The hard disk drive 30 stores varied software, including operating system, application program with which document information and image information can be created, and printer driver 20 for controlling printers. When executed, these software is transferred to the RAM by the CPU as appropriate. The CPU uses the RAM as a temporary work area and accesses it as appropriate to execute various programs, such as the printer driver 20.

The input interface is connected with a keyboard and a mouse (now shown) as input devices for operation, and under the application programs, various operations and the like can be performed through the input devices. The CRT interface is connected with a display for indication. Further, the printer interface is connected with a printer 40. The print control program according to the present invention is the above printer driver 20. In this sense, the hard disk drive 30 on which the printer driver 20 is stored is a medium with the print control program recorded thereon. However, the recording medium on which the print control program can be stored is not limited to hard disk. For example, the program may be stored on CD-ROM, a flexible disk, a magneto-optic disk, or nonvolatile memory which is a semiconductor device. Further, a communication interface, such as modem, connected to the system bus may be connected to the Internet. Then, an access may be made to a server which stores various programs, and the print control program according to the present invention may be downloaded.

With the application programs, retouching of color images and the like can be performed. With a relevant application program executed, the user can operate the input devices for operation to give instructions to print color images. When a printing instruction is given under an application program, the printer driver 20 is driven, and the following operation is performed: referring to LUT to be described later, color conversion is carried out, and recording rate conversion data according to the present invention is applied to the image data obtained by the color conversion. Further, half tone processing or the like is performed, and thus print data is created. Then, the printer 40 is caused to perform print operation.

To perform this print operation, the printer driver 20 comprises an image data acquisition module 21; a resolution conversion module 22; a color conversion module 23; a large/medium/small dot assignment module 24; a half tone processing module 25; and a print data creation module 26. The image data acquisition module 21 acquires image data for which an instruction to perform print operation is given. The acquired image data is data wherein the color of each pixel is represented by R, G, and B color component values.

The resolution conversion module 22 is a module capable of interpolation. If the number of pixels in the acquired image data is different from that printed with the printer 20, the module 22 scales up or down the image by interpolation. In case of scaledown, pixel skipping may be employed. The color conversion module 23 is a module which refers to LUT 31 stored on the hard disk drive 30 and converts the color system of color component values in image data from the RGB color system to the CMYKlclm (lc: light cyan, lm: light magenta) color system. The image data obtained by the above resolution conversion is subjected to color conversion by the color conversion module 23.

The printer 40 in this embodiment uses inks in six colors, C, M, Y, K, lc, and lm, and the color conversion module 23 converts the RGB color system into the CMYKlclm color system. Needless to add, if the present invention is applied to a printer which uses four colors, C, M, Y, and K, the module 23 converts the RGB color system into the CMYK color system. In case of a printer which uses seven colors, C, M, Y, K, lc, lm, and DY (DY: dark yellow), the module 23 converts the RGB color system into the CMYKlclmDY color system.

After the color conversion module 23 carries out color conversion, the color of each pixel is represented by a combination of color component values corresponding to C, M, Y, K, lc, and lm ink colors. In this embodiment, each color component value has 256 levels of gray. In the printer 40, each of the C, M, Y, K, lc, and lm color inks can be discharged from the corresponding nozzle with three different dot diameters, large, medium, and small. If state in which a dot is not formed is included, four levels of tone can be provided with respect to each pixel. In final printed matter, inks in various colors are recorded at ink recording rates corresponding to the individual color component values by half tone processing.

For this purpose, in this embodiment, individual color component values are converted into ink recording rates for large, medium, and small dot diameters. Then, based on the ink recording rates, half tone processing is carried out to determine whether to discharge ink and a dot diameter with respect to each pixel. The processing of acquiring ink recording rates for large, medium, and small dot diameters from color component values is performed by the large/medium/small dot assignment module 24. That is, the large/medium/small dot assignment module 24 is a module which performs the following operation: the module 24 refers to recording rate conversion data 32a to 32d wherein color component values are in correspondence with ink recording rates for individual dot diameters. Then, the module 24 converts color component values into ink recording rates for large, medium, and small dot diameters. At this time, the module acquires the color component values of the C, M, Y, K, lc, and lm colors from the color conversion module 23, and obtains the ink recording rates for large, medium, and small dot diameters.

In this embodiment, conversion is carried out in correspondence with the depth characteristics of ink colors. Therefore, four different types of recording rate conversion data 32a to 32d corresponding to the depths of ink colors are provided and stored on the hard disk drive 30 beforehand. More specific description will be given. The K ink is much deeper than the other inks, and recording rate conversion data 32a for K is provided solely for the K ink. The C ink and the M ink are substantially identical in depth, and they are paler than the K ink and deeper than the lc, lm, and Y inks. Therefore, recording rate conversion data 32*b* for C and M is provided for the C ink and the M ink in common.

The lc ink and the lm ink are substantially identical in depth, and they are paler than the K, C, and M inks and deeper than the Y ink. Therefore, recording rate conversion data 32*c* for lc and lm is provided for the lc ink and the lm ink in common. The Y ink is much paler than the other inks, and recording rate conversion data 32*d* for Y is provided solely for the Y ink. The depth characteristics of ink colors described here correspond to lightness change versus linear variation in ink recording rate with respect to each color, as described later.

As mentioned above, the ink recording rates of large, medium, and small dots are acquired from color component values by the large/medium/small dot assignment module 24. Then, the half tone processing module 25 carries out half tone processing with respect to the ink recording rates. That is, the module 25 creates dot data which indicates which should be discharged, large, medium, or small dot, in the printer 40 with respect to each pixel. After the half tone processing module 25 creates dot data, the print data creation module 26 creates print data based on the dot data and outputs the print data to the printer 40.

Ink discharge nozzles Nz are formed in rows on the head of the printer 40, as described later. In each nozzle row, a plurality of discharge nozzles are arranged in the direction of auxiliary pass. Therefore, pieces of data dissociated from each other by the amount equivalent to several dots in the direction of auxiliary pass are simultaneously used. Consequently, rasterization is carried out. This is processing wherein pieces of data aligned in the direction of main pass are rearranged so that those to be used will be simultaneously buffered in the printer 40. After the rasterization, required information, such as the resolution of images, is added to create print data. The print data is outputted to the printer 40 through the printer interface, and the printer 40 prints the image based on the print data.

To perform this print operation, the printer 40 has the structure illustrated in FIG. 2. As illustrated in the figure, the bus 40*a* installed in the printer 40 is connected with CPU 41, ROM 42, RAM 43, ASIC 44, a control IC 45, a computer interface 46, an interface 47 for transmitting image data, driving signals, and the like, and the like. The CPU 41 uses the RAM 43 as a work area, and controls various parts according to programs written in the ROM 42. The ASIC 44 is an IC customized for driving a print head (not shown), and transmits and receives predetermined signals to and from the CPU 41 and performs processing for driving the print head. Further, the ASIC 44 outputs applied voltage data to a head drive unit 49.

The control IC 45 is an IC which controls cartridge memories which are nonvolatile memories mounted in respective ink cartridges 48*a* to 48*f*. Under the control of the CPU 41, the control IC 45 reads out information on ink color and remaining quantity recorded in the cartridge memories, updates information on remaining ink quantity, and performs other like operations. The computer interface 46 is connected with the printer interface of the computer 10. The printer 40 receives print data transmitted from the computer 10 through the computer interface 46. The I/F 47 is connected with a carriage mechanism 47*a* and a paper feed mechanism 47*b*. The paper feed mechanism 47*b* comprises a paper feed motor, paper feed rollers, and the like, and successively feeds printing and recording media, such as printing paper, to make auxiliary passes. The carriage mechanism 47*a* comprises a carriage mounted with the print head, and reciprocates the carriage to cause the print head to make main passes.

The head drive unit 49 is a circuit comprising a dedicated IC, transistors for driving, and the like. The head drive unit 49 generates applied voltage patterns for piezo elements built in the print head based on applied voltage data inputted from the ASIC 44. The print head is connected through ink-by-ink tubes with cartridge holders 48 on which ink cartridges 48*a* to 48*f* filled with inks in six (C, M, Y, K, lc, and lm) colors are loadable. Thus, the print head is supplied with the inks.

Figure 3:
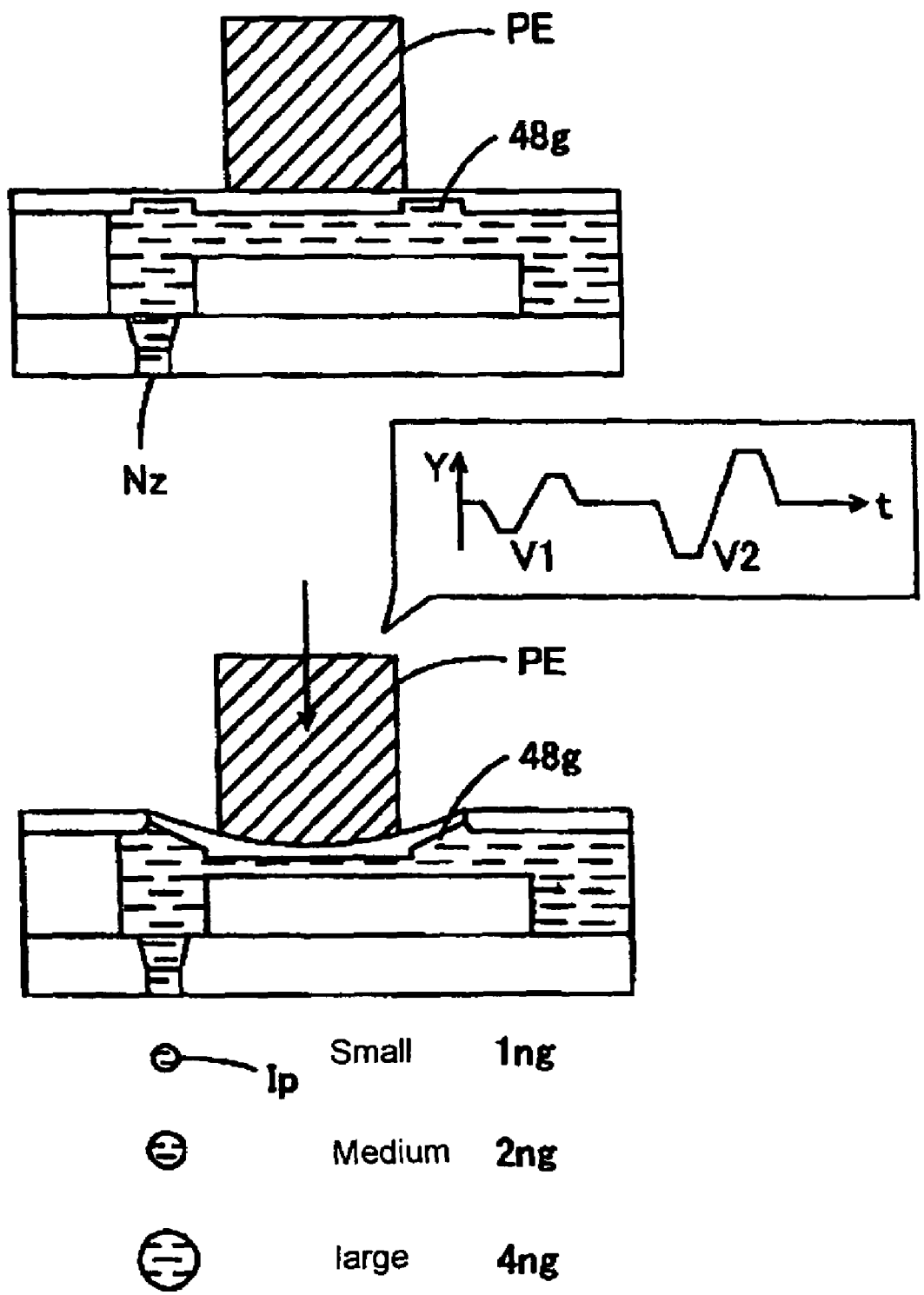
FIG. 3 is an enlarged view illustrating a nozzle and its internal structure.

In the ink discharge portion of the print head, six sets of nozzle rows each of which discharges respective color ink are formed in alignment in the direction of main pass of the print head. In each nozzle row, a plurality of nozzles are disposed at equal intervals in the direction of auxiliary pass. FIG. 3 is an enlarged view illustrating a nozzle and its internal structure. As illustrated in the figure, the ink in the ink cartridges 48*a* to 48*f* and ink chambers 48*g* are connected to each other through the above-mentioned tubes. The ink supplied reaches the opening of the nozzle Nz which is open under the head.

The piezo element PE is expanded and contracted by applied voltage generated by the head drive unit 49, and thereby varies the volumetric capacity of the corresponding ink chamber 48*g*. As a result, ink droplets Ip are discharged from the opening of the nozzle Nz. The ink droplets Ip stick to a printing medium, and printing is thereby implemented. The central part of FIG. 3 illustrates an example of the applied voltage pattern for driving the piezo element PE. The head drive unit 49 is capable of generating two types of applied voltage, pattern V1 and pattern V2, at one time of ink discharge. The dot diameter of discharged ink is adjusted by combinations of these patterns.

If a piezo element PE is driven only by applied voltage in pattern V1 at one time of ink discharge, a small dot is discharged. If a piezo element PE is driven only by applied voltage in pattern V2 at one time of ink discharge, a medium dot is discharged. If a piezo element PE is driven by applied voltage both in pattern V1 and in pattern V2 at one time of ink discharge, a large dot is discharged. In this embodiment, the weight of ink in small dot is 1 ng; the weight of ink in medium dot is 2 ng; and the weight of ink in large dot is 4 ng. Further, by changing the applied voltage pattern, the ink weight can be varied.

With respect to the weight ratio of ink droplet, it will be assumed that print operation is performed with a ratio of 1 large dot to 4 small dot (or 1 large dot to 2 medium dot) per unit area for each color. Thus, the weights of inks recorded on printing paper are equalized. However, when both the pieces of printed matter are compared with each other, they are different from each other in lightness. To cope with this, in the present invention, consideration is given to that lightness change versus increase in ink recording rate differs depending on dot diameter when recording rate conversion data 32*a* to 32*d* is created. If inks are different in color, the grainy appearance the printed matter gives differs even if the inks are used with the same dot diameter and the same quantity. Consequently, in the present invention, four different types of recording rate conversion data are created, and the objects of conversion, for example, K and C, M and lc, or lm and Y, are defined beforehand.

Figure 4:
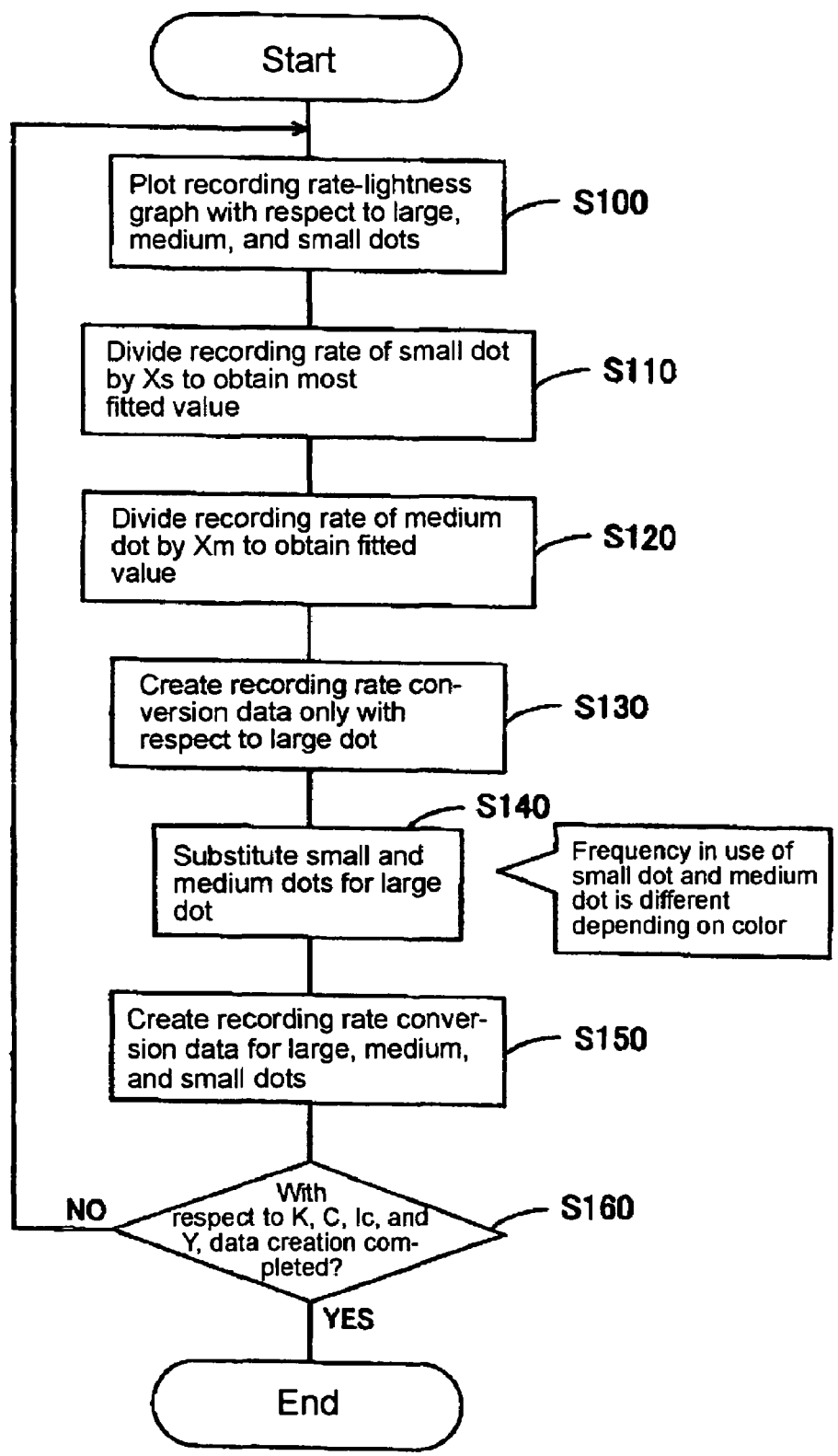
FIG. 4 is a flowchart illustrating the procedure for creating recording rate conversion data.

(2) Creation of Recording Rate Conversion Data:

As mentioned above, recording rate conversion data is created with the correspondence between ink recording rate and lightness change and difference in grainy appearance from one ink color to another taken into account. Next, a procedure for creating the recording rate conversion data as mentioned above will be described. The procedure requires many computations, and it is preferable that a computer, such as the PC 10, should be utilized. FIG. 4 is a flowchart illustrating the procedure for creating recording rate conversion data. When recording rate conversion data is created in this embodiment, small dots and medium dots are substituted for large dots, and ink recording rates for the individual dot diameters are determined. Then, processing is performed with respect to each of the C, M, Y, K, lc, and lm colors. At Step 100, for an ink color for which data is to be created, a graph indicating the correspondence between ink recording rate and lightness is plotted with respect to each of large, medium, and small dots.

Figure 5:
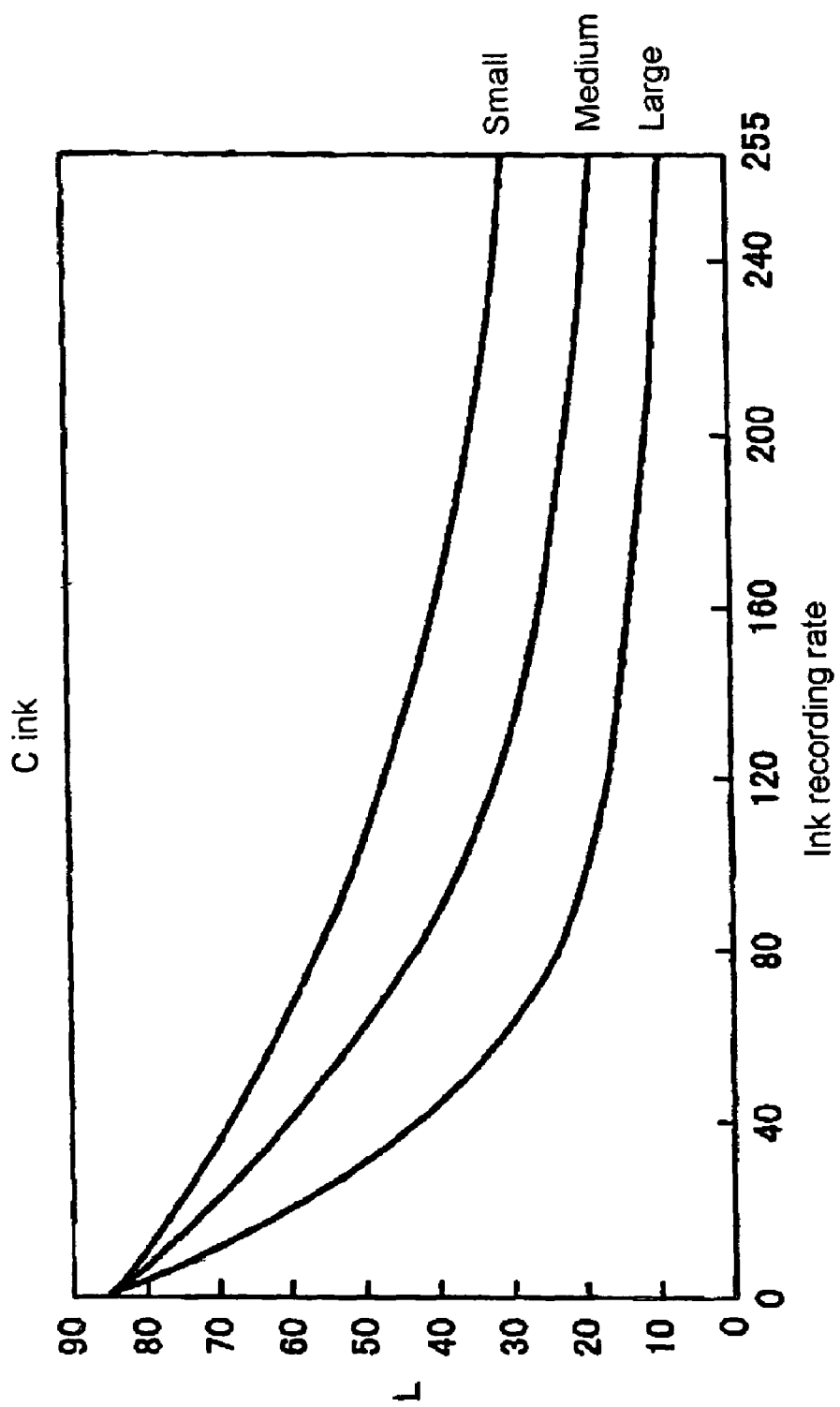
FIG. 5 is a graph illustrating the correlation between ink recording rate and lightness.

FIG. 5 is a graph indicating the correspondence between ink recording rate and lightness plotted with respect to the C ink. In the graph, ink recording rate is taken on the horizontal axis, and lightness is taken on the vertical axis. In reality, the graph can be drawn as follows: image data which indicates patches at individual ink recording rates with respect to each dot diameter is created. Half tone processing is carried out, and print data is outputted. Then, obtained print results are subjected to color measuring or the like. The ink recording rate has a gradation value of 0 to 255, specifying various states from state in which dots are not recorded to state in which dots are recorded to the upper limit of duty limitation (ink quantity limitation) per unit area.

As illustrated in the figure, the lightness range of small dot is narrowest, and the lightness range becomes wider in the order of medium dot and large dot. The curve for each dot diameter is convex downward. At low ink recording rates, the rate of lightness change is highest with large dot, and is lowered in the order of medium dot and small dot. The figure shows the correspondence in the C ink, and the trend indicated by the curves is common to the other colors though they are different in lightness range.

Figure 6:
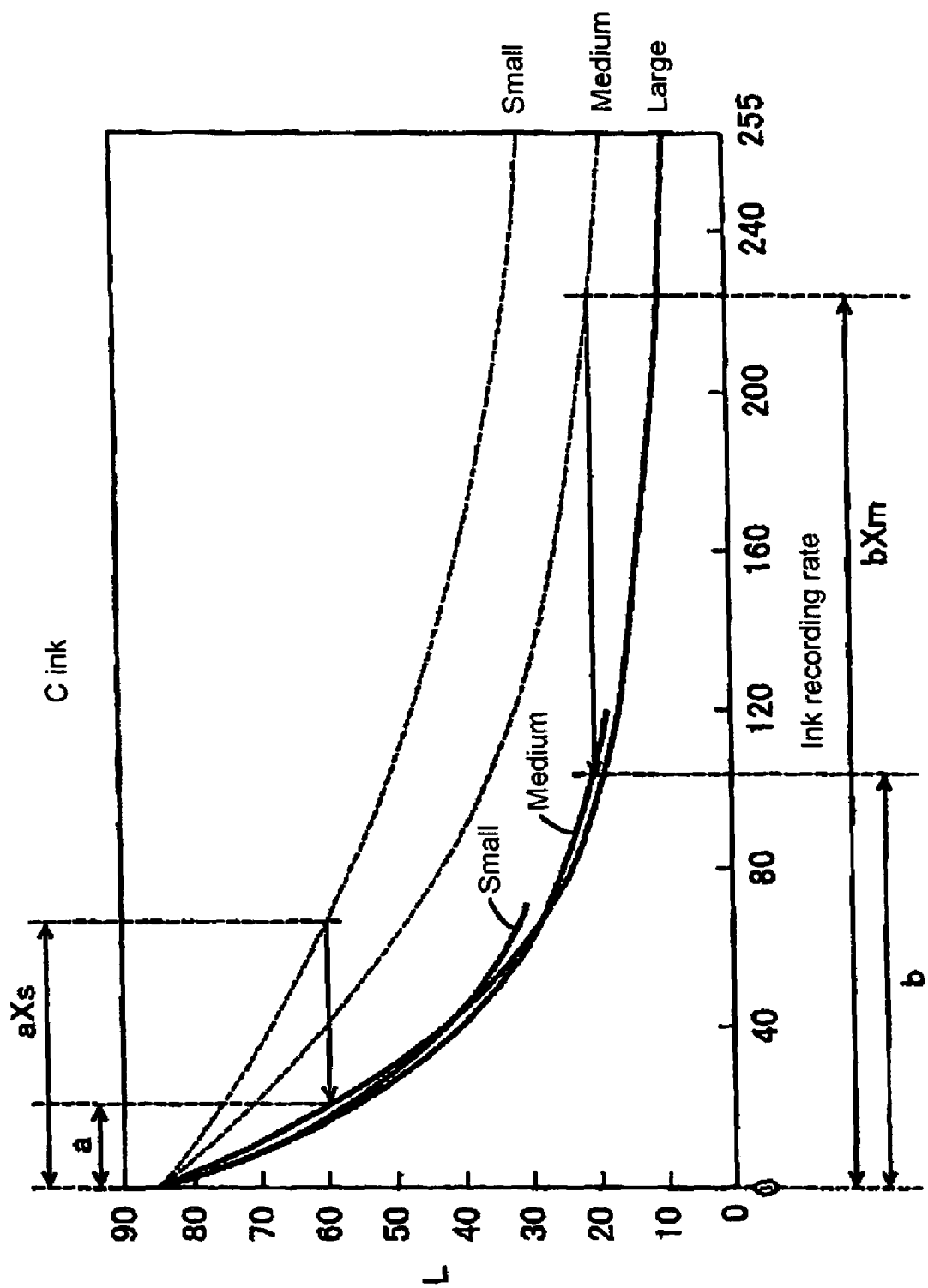
FIG. 6 is an explanatory drawing illustrating how the ink recording rates of dots are divided by a constant Xs to fit their curves to the curve of the large dot.

In this embodiment, the quantity of ink substitution is computed based on this graph. At Step 110, the recording rate of small dot is divided by a constant Xs to obtain a constant Xs most fitted to the curve of large dot. FIG. 6 illustrates how the ink recording rates of dots are divided by a constant Xs to fit their curves to the curve of large dot. In this figure as well, ink recording rate is taken on the horizontal axis, and lightness is taken on the vertical axis. The curves before the recording rates are divided by the constant are indicated by broken lines. In the graph in FIG. 6, when the ink recording rates are divided by the constant, the broken lines are contracted to the left. Therefore, the lightness change of small dot can be partly fitted to the lightness change of large dot by adjusting the constant Xs.

In the figure, the state in which the lightness change of small dot is fitted to the lightness change of large dot by division by the constant Xs is indicated by a solid line. At this time, the ratio of the ink recording rate before division to that after division for the same value of lightness is aXs:a (a is an arbitrary value). It can be grasped by various methods whether the lightness change of dots is fitted to that of large dot after division by the constant Xs. For example, differences in the value of lightness at individual ink recording rates are added up, and a value which minimizes the result of the addition is selected. The constant Xs can be selected by various methods. The constant Xs obtained as mentioned above indicates the quantity of ink with small dot substituted for that with large dot. That is, by substituting Xs small dot for 1 large dot, substitution can be implemented with differences from one dot diameter to another compensated.

A Step 120, the above-mentioned processing is performed on medium dot. That is, the recording rate of medium dot is divided by a constant Xm to obtain a constant Xm most fitted to the curve of large dot. In FIG. 6, with respect to medium dot as well, the curve before the ink recording rate is divided by the constant is indicated by a broken line. The state in which the lightness change of medium dot is fitted to that of large dot by division by the constant Xm is indicated by a solid line. At this time, the ratio of the ink recording rate before division to that after division for the same value of lightness is bXm:b (b is an arbitrary value). The constant Xm obtained as mentioned above indicates the quantity of ink with medium dot substituted for that with large dot.

Figure 7:
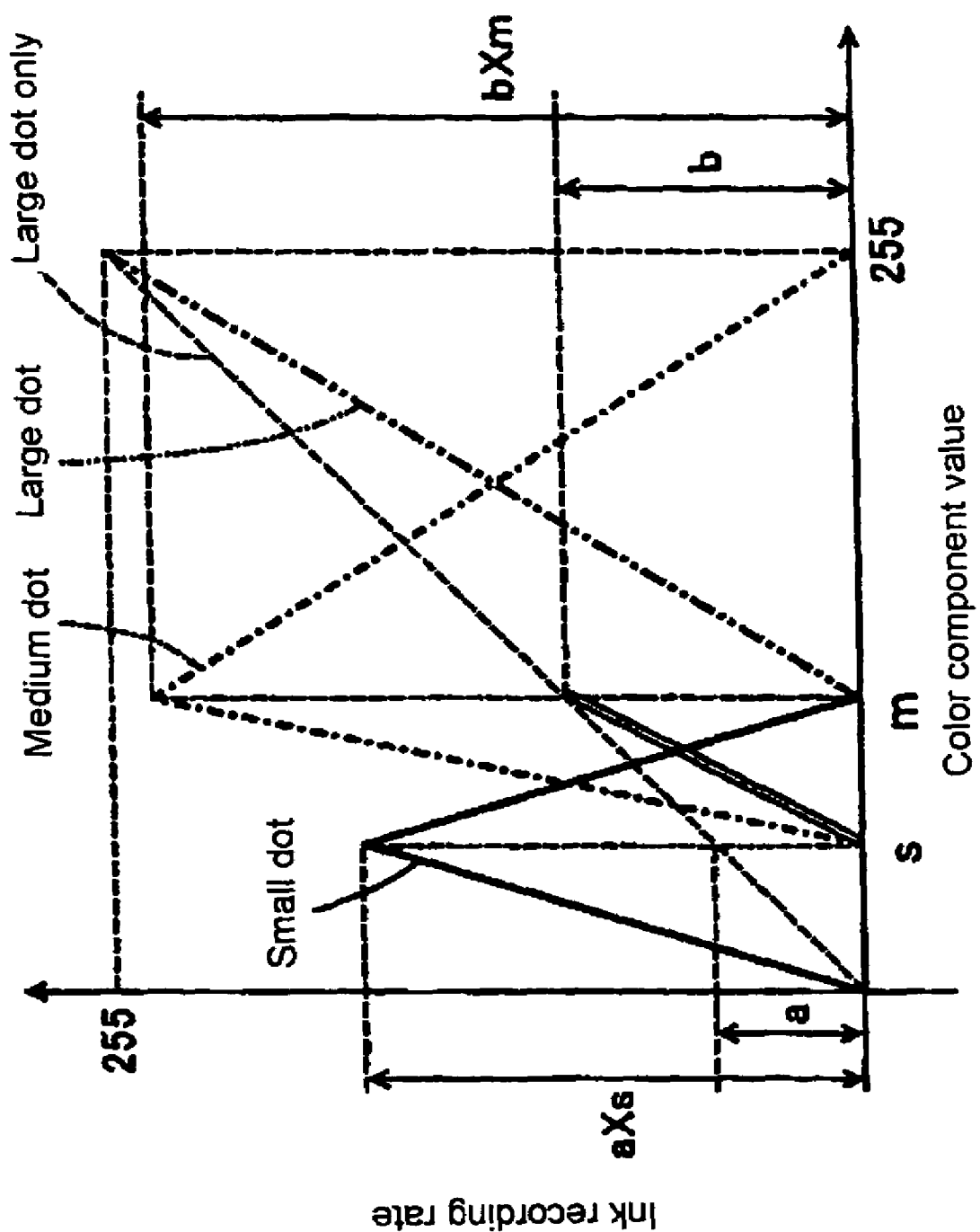
FIG. 7 is an explanatory drawing illustrating substituting operation.

As mentioned above, the quantities of inks with small dot and medium dot substituted for that with large dot are grasped. Then, the correlation between color component value and ink recording rate can be determined with respect to large, medium, and small dots by substitution for the ink recording rate of large dot. FIG. 7 is an explanatory drawing illustrating this substituting operation. In this figure, the color component values of the C, M, Y, K, lc, and lm colors are taken on the horizontal axis, and ink recording rates are taken on the vertical axis. The figure shows the case of the C ink in concert with FIG. 5 and FIG. 6.

At Step 130, firstly, the correlation between color component value and ink recording rate is determined only with respect to large dot. In FIG. 7, as indicated by a broken line, the correlation is defined only with respect to large dot on the assumption that: as the color component value is linearly increased from 0 to 255, the ink recording rate is linearly increased from 0 to 255. In this embodiment, at Step 140, the large dot is replaced with the small dot and medium dot based on this assumption. As mentioned above, the substitution ratio is determined as aXs:a with respect to small dot. Therefore, in the low-color component value region, aXs is taken as the ink recording rate for the ink recording rate a of large dot.

In FIG. 7, the correlation of only large dot indicated by a broken line is expressed as a straight line with a gradient of "1." Therefore, with respect to small dot, a straight line with a gradient of Xs is obtained as indicated by a solid line. With respect to small dot, a straight line with a gradient of Xs is obtained from a color component value of 0 to a color component value of s at which the ink recording rate of small dot is maximized. Thereafter, a straight line with a gradient of −Xs is obtained from the color component value of s to a color component value of m at which the ink recording rate of medium dot is maximized. As a result, the ink recording rate of large dot is 0 from the color component value of 0 to the color component value of s. For the color component values of s to m, the ink recording rate indicated by a double line is obtained.

Next, for the color component value of s to m, the ink recording rate of large dot only, indicated by the double line is replaced with ink with medium dot. As mentioned above, the substitution ratio of medium dot is bXm:b. Therefore, a straight line with a gradient Xm times the gradient of the double line, indicated by an alternate long and short dash line, is obtained as the ink recording rate of medium dot. For the color component values of m to 255, the ink recording rate which linearly varies the ink recording rate of medium dot from the maximum value to 0 is obtained. For the rest, the ink recording rate of large dot, indicated by an alternate long and two short dashes line, is obtained. As mentioned above, the substitution ratio of aXs:a is equivalent to the quantity of small dot which gives lightness equivalent to the lightness of printed matter by large dot. As mentioned above, the substitution ratio of bxm:b is equivalent to the quantity of medium dot which gives lightness equivalent to the lightness of printed matter by large dot.

Therefore, substituting the substitution ratio of aXs:a or bXm:b for the ink recording rate of large dot, as mentioned above, gives the following result: lightness observed when printing operation is performed by combinations of small dots and medium dots is matched with lightness change observed when printing operation is performed at the ink recording rate of large dot only, indicated by the broken line. In the broken line shown in FIG. 7, the lightness of the print result linearly changes with linear change in color component value. Then, the lightness of the print result linearly changes with linear change in color component value even if print operation is performed by combinations of small dots and medium dots.

In the above-mentioned processing, the lightness of the print result linearly changes with linear change in color component value. To make this take place, there is no special limitation to the color component value s which maximizes the ink recording rate of small dot or the color component value m which maximizes the ink recording rate of medium dot. However, the inks in C, M, Y, K, lc, and lm colors are different in ink characteristics, as mentioned above. Therefore, to accommodate to the characteristics of each ink color, it is preferable that the frequency in use of small dot and medium dot should be changed with respect to each characteristic of ink colors.

Figure 8:
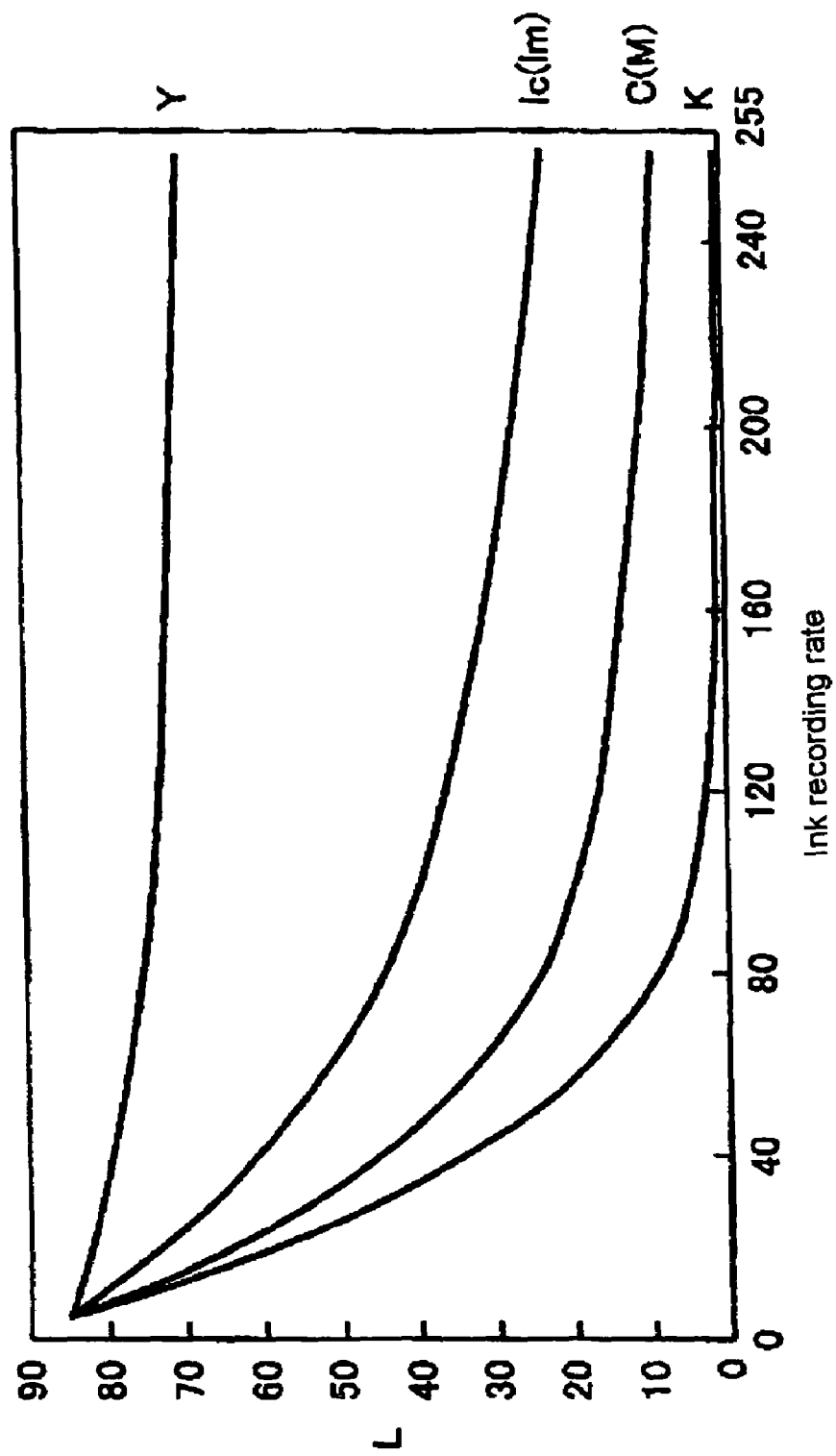
FIG. 8 is an explanatory drawing illustrating the lightness change characteristics which differ from one ink color to another.

Consequently, in this embodiment, different values are taken as the color component value s which maximizes the ink recording rate of small dot and the color component value m which maximizes the ink recording rate of medium dot, depending on the characteristics of ink color. FIG. 8 is an explanatory drawing illustrating the lightness change characteristics which differ depending on ink color (depth). The figure is a graph showing the correlation between the ink recording rate of large dot and the lightness with respect to the Y, lc, C, and K inks. In this figure, ink recording rate is taken on the horizontal axis, and lightness is taken on vertical axis. These curves are those of the Y ink, lc ink, C ink, and K ink from above. The correlation of the lm ink and that of the lc ink are substantially identical with each other, and the correlation of the C ink and that of the M ink are substantially identical with each other.

As illustrated in the figure, as the color becomes deeper from Y to lc to C to K, the region of lightness which can be represented becomes wider. At lower ink recording rates, the lightness is more steeply lowered with increase in recording rate. Therefore, even slight change in ink quantity greatly affects humans' eyes. Meanwhile, when lightness changes versus ink recording rate are compared with respect to large, medium, and small dots, as illustrated in FIG. 5, the following becomes obvious: as the dot diameter is increased, the region of lightness which can be represented becomes wider. At lower ink recording rates, the lightness is more steeply lowered with increase in recording rate. Therefore, even slight change in ink quantity greatly affects humans' eyes.

Figure 9:
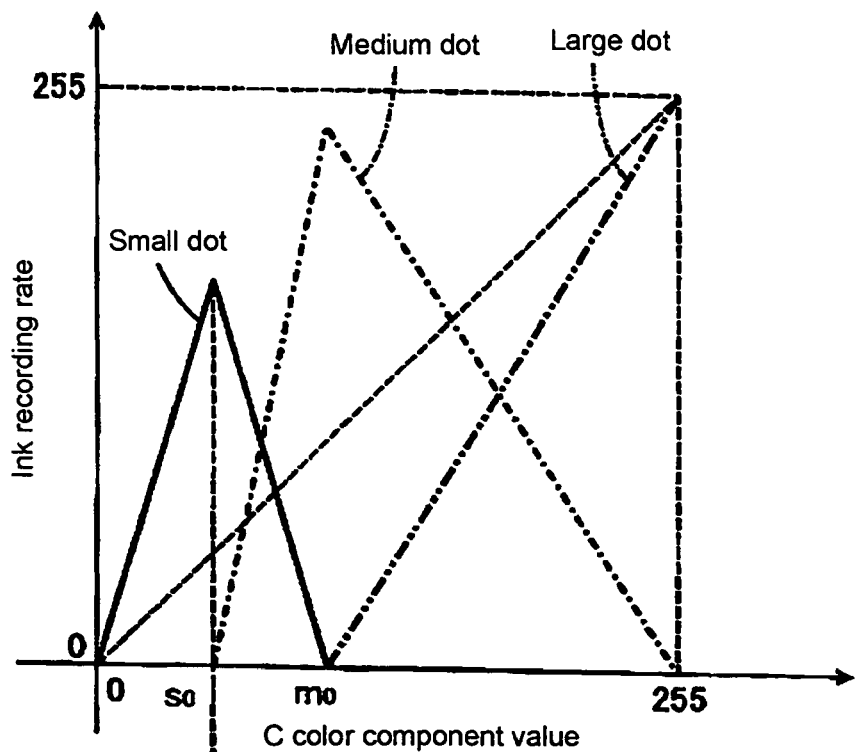
FIG. 9 is an explanatory drawing illustrating how color component values s and m differ depending on color.
Figure 9:
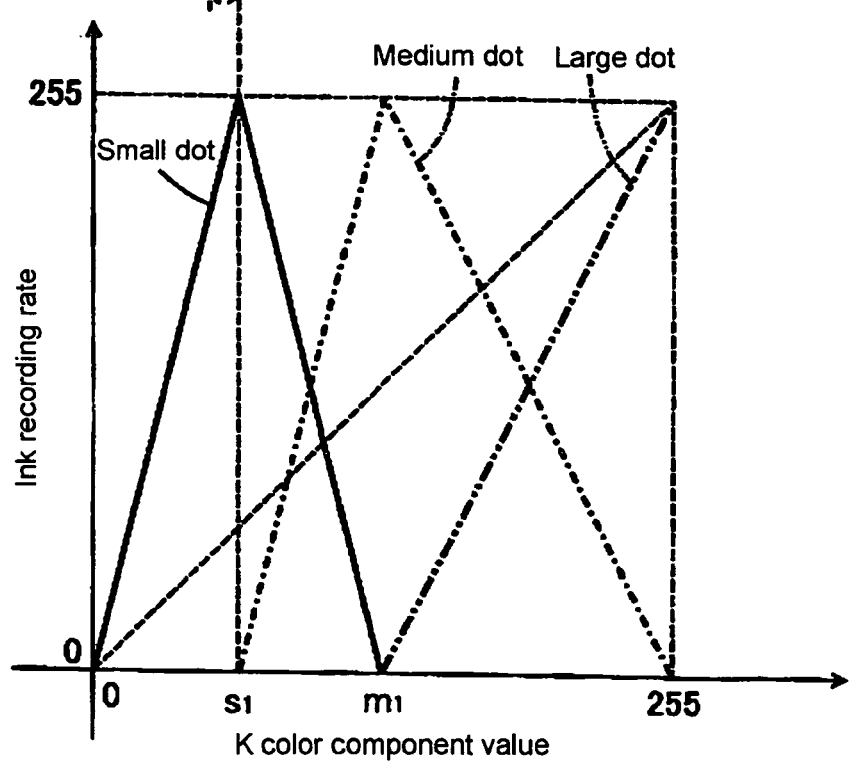

Because of the above-mentioned ink characteristics, as the color of ink becomes deeper, or as the dot diameter becomes larger, the dot becomes more prominent and the printed matter becomes more prone to give grainy appearance. Consequently, in this embodiment, for deeper ink color, the frequency in use of the ink with small dot diameter is increased at lower ink recording rates. More specifically, when ink with large dot is replaced with that with small dot and medium dot, the color component values s and m are varied, as illustrated in FIG. 9.

That is, for deeper ink colors, the color component values s and m are increased. The example shown at the upper part of FIG. 9 is the ink recording rate of the C ink illustrated in FIG. 7. The example shown at the lower part of FIG. 9 is the ink recording rate o the K ink. As illustrated in FIG. 9, the color component value $s_0$ which maximizes the ink recording rate of small dot with respect to the C ink is smaller than the color component value $s_1$ which maximizes the ink recording rate of small dot with respect to the K ink. Further, the color component value $m_0$ which maximizes the ink recording rate of medium dot with respect to the C ink is smaller than the color component value $m_1$ which maximizes the ink recording rate of medium dot with respect to the K ink.

For this reason, the integral of the ink recording rate with respect to the color component value of small dot is greater for the K ink than for the C ink. That is, at low ink recording rates, the frequency in use of the K ink with small dot is higher. At Step 140, differences in ink characteristics from ink color to ink color are taken into account. The deeper the ink color is, the higher the color component value s is made. Thus, the deeper the ink color is, the higher the frequency in use of small dot is. Needless to add, such a constitution that the deeper the ink color is, the higher the frequency in use of medium dot is may be adopted.

In either case, by substituting ink with small and medium dots for ink with large dot at Step 140, the correlation between color component value and ink recording rate can be established with respect to each dot diameter, as illustrated in FIG. 7 and the like. Consequently, at Step 150, table data wherein relevant color component values are in correspondence with ink recording rates is created. The, the created data is recorded as recording rate conversion data on the hard disk drive 30. At Step 160, it is judged whether recording rate data has been created with respect to all of the K, C, lc, and Y inks. The processing of Step 100 and the following steps is repeated until it is judged at Step 160 that recording rate data has been created with respect to all of the K, C, lc, and Y inks. More specifically, large dots are replaced with small dots and medium dots, and further the color component value s is varied with respect to each characteristic of ink color. Thus, recording rate data for converting each of the K, C, lc, and Y inks is created.

(3) OTHER EMBODIMENTS

In the present invention, it only has to be possible to suppress the influences of differences in lightness change versus increase in ink recording rate from dot diameter to dot diameter. Further, it only has to be possible to perform print operation so that difference in grainy appearance from ink color to ink color is prevented. Therefore, in addition to the above embodiment, other various constitutions can be adopted. Examples are as follows: in the above embodiment, there are four different types of recording rate conversion data. Needless to add, six different types of recording rate conversion data may be created to accommodate all of the six (C, M, Y, K, lc, and lm) colors. Or, the C ink and the K ink may be converted by the same recording rate conversion data, and three different types of recording rate conversion data may be utilized. Thus, taking the memory capacity for storing recording rate conversion data, working efficiency, and the like into account, various constitutions can be adopted.

In the above embodiment, when recording rate conversion data is created, the correlation between color component value and ink recording rate is made capable of being represented as a straight line only with respect to large dot. Needless to add, other constitutions can be adopted. For example, it can be represented as a curve with the characteristics of inks taken into account. More specific description will be given. As illustrated in FIG. 5, while the recording rate of ink is linearly varied, the lightness is not linearly varied. Therefore, the correlation between the color component values of large dot only and the ink recording rates may be represented as a curve so that when the color component value is varied, the lightness will be linearly varied. This constitution can be implemented by making the broken line, indicated only with respect to large dot in FIG. 7, convex downward, or taking other like measures.

More specific description will be given. Because of the characteristics of ink, the lightness is greatly varied as compared with change in recording rate in the low-ink recording rate region, as illustrated in FIG. 5. Therefore, if the curve indicating the above correlation with respect to large dot is made convex downward, the following takes place: the rate of change in ink recording rate is lowered with increase in color component value in the low-color component value region. Thus, bias in rate of change can be canceled out, and lightness change can be made linear. The lightness change versus ink recording rate differs depending on color. Therefore, the curve indicating the ink recording rate only with respect to large dot in FIG. 7 may be changed from color to color, needless to add.

In addition, other constitutions can be adopted. For example, the ink recording rate for large, medium, and small dots and with respect to each color may be adjusted according to recording rate conversion data. Alternatively, the weight itself of ink discharged from nozzles may be varied as appropriate. More specific description will be given. In the above embodiment, the weight of ink discharged from a nozzle can be varied by changing the waveform of applied voltage patterns V1 and V2. Therefore, the applied voltage patterns V1 and V2 may be changed depending on color.

An example is as follows: as mentioned above, the weights of inks with large, medium, and small dot diameters are set to 1 ng, 2 ng, and 4 ng, respectively. The constants Xs and Xm are computed by the same processing as that of Steps 100 to 120. Then, the applied voltage patterns V1 and V2 are adjusted so that the ratio of the weight of ink with large dot to that with small dot will be Xs:1 and the ratio of the weight of ink with large dot to that with medium dot will be Xm:1. This constitution can be implemented as follows: such applied voltage patterns V1 and V2 that the ratio of the weight of ink with large dot to that with small dot will be Xs:1 and the ratio of the weight of ink with large dot to that with medium dot will be Xm:1 are computed with respect to each color. The color of ink discharged is judged at the head drive unit 49, and applied voltage corresponding to that color is generated.

Although the prevent invention has been described and illustrated in detail, it is clearly understood that the same is by way of illustration and example only and is not to be taken by way of limitation, the spirit and scope of the present invention being limited only by the terms of the appended claims.

What is claimed is:

1. A print controller comprising:
an image data acquiring unit which acquires image data wherein images are rendered with color component values corresponding to ink colors used in a printing device;
a recording rate conversion data storing unit which stores a plurality of pieces of recording rate conversion data wherein the color component values in the image data are in correspondence with ink recording rates for a plurality of dot diameters and ink colors to which individual recording rate conversion data is applied are determined beforehand;
an image data converting unit which, with respect to the color component values in said acquired image data, refers to recording rate conversion data applied to the ink colors, and converts the color component values into ink recording rates for a plurality of dot diameters; and
an image printing unit which performs print operation based on the ink recording rates obtained by the conversion.

2. The print controller according to claim 1,
wherein in said recording rate conversion data, the correspondence between the color component values in image data and ink recording rates for a plurality of dot diameters differs according to the depth of the ink colors.

3. The print controller according to claim 1 or claim 2,
wherein in said recording rate conversion data, the correspondence between the color component values in image data and ink recording rates for a plurality of dot diameters is different depending on the depth of each ink color, and said correspondence is defined so that the frequency in use of small dot diameter is higher for inks with in deeper colors than for inks in paler colors.

4. A print controller comprising:
an image data acquiring unit which acquires image data wherein images are rendered with color component values corresponding to ink colors used in a printing device;
a recording rate conversion data storing unit which stores recording rate conversion data wherein the color component values in the image data are in correspondence with ink recording rates for a plurality of dot diameters;
an image data converting unit which refers to said recording rate conversion data, and converts the color component values in said acquired image data into ink recording rates for a plurality of dot diameters; and
an image printing unit which discharges ink in different discharge quantities depending on ink color when the presence/absence of ink discharge is determined with respect to each dot diameter at each pixel based on the ink recording rates obtained by the conversion and print operation is performed.

5. The print controller according to claim 4,
wherein in said image printing unit, the discharge quantity is smaller for inks in deeper colors than for inks in paler colors.

6. A print control method wherein color component values corresponding to ink colors used in a printing device are converted into the recording rates of ink droplets in various color before print operation is performed with the printing device, the method comprising:

an image data acquiring step of acquiring image data wherein images are rendered with color component values corresponding to ink colors used in the printing device;

an image data converting step of storing beforehand on a storage medium a plurality of pieces of recording rate conversion data wherein the color component values in the image data are in correspondence with ink recording rates for a plurality of dot diameters and ink colors to which individual recording rate conversion data is applied are determined beforehand, referring to the recording rate conversion data applied to ink color with respect to each color component value in said acquired image data, and converting the color component values into ink recording rates for a plurality of dot diameters; and an image printing step of performing print operation based on the ink recording rates obtained by the conversion.

7. A print control method wherein color component values corresponding to ink colors used in a printing device are converted into the recording rates of ink droplets in various color before print operation is performed with the printing device, the method comprising:

an image data acquiring step of acquiring image data wherein images are rendered with color component values corresponding to ink colors used in the printing device;

an image data converting step of storing beforehand on a storage medium recording rate conversion data wherein the color component values in the image data are in correspondence with ink recording rates for a plurality of dot diameters, referring to the recording rate conversion data, and converting the color component values in said acquired image data into ink recording rates for a plurality of dot diameters; and an image printing step of discharging ink in different discharge quantities depending on ink color when the presence/absence of ink discharge is determined with respect to each dot diameter at each pixel based on the ink recording rates obtained by the conversion and print operation is performed.

8. A print control program product for converting color component values corresponding to ink colors used in a printing device into the recording rates of ink droplets in various colors and performing print operation with the printing device, the program product causing a computer to implement:

an image data acquiring function for acquiring image data wherein images are rendered with color component values corresponding to ink colors used in a printing device;

a recording rate conversion data storing function for storing a plurality of pieces of recording rate conversion data wherein the color component values in the image data are in correspondence with ink recording rates for a plurality of dot diameters and ink colors to which individual recording rate conversion data is applied are determined beforehand;

an image data converting function for referring to recording rate conversion data applied to ink color with respect to each color component value in said acquired image data, and converting the color component values into ink recording rates for a plurality of dot diameters; and an image printing function for performing print operation based on the ink recording rates obtained by the conversion.

9. A print control program product for converting color component values corresponding to ink colors used in a printing device into the recording rates of ink droplets in various colors and performing print operation with the printing device, the program product causing a computer to implement:

an image data acquiring function for acquiring image data wherein images are rendered with color component values corresponding to ink colors using in the printing device;

a recording rate conversion data storing function for storing recording rate conversion data wherein the color component values in the image data are in correspondence with ink recording rates for a plurality of dot diameters;

an image data converting function for referring to said recording rate conversion data and converting the color component values in said acquired image data into ink recording rates for a plurality of dot diameters; and an image printing function for discharging ink in different discharge quantities depending on ink color when the presence/absence of ink discharge is determined with respect to each dot diameter at each pixel based on the ink recording rates obtained by the conversion and print operation is performed.

* * * * *